UNITED STATES PATENT OFFICE.

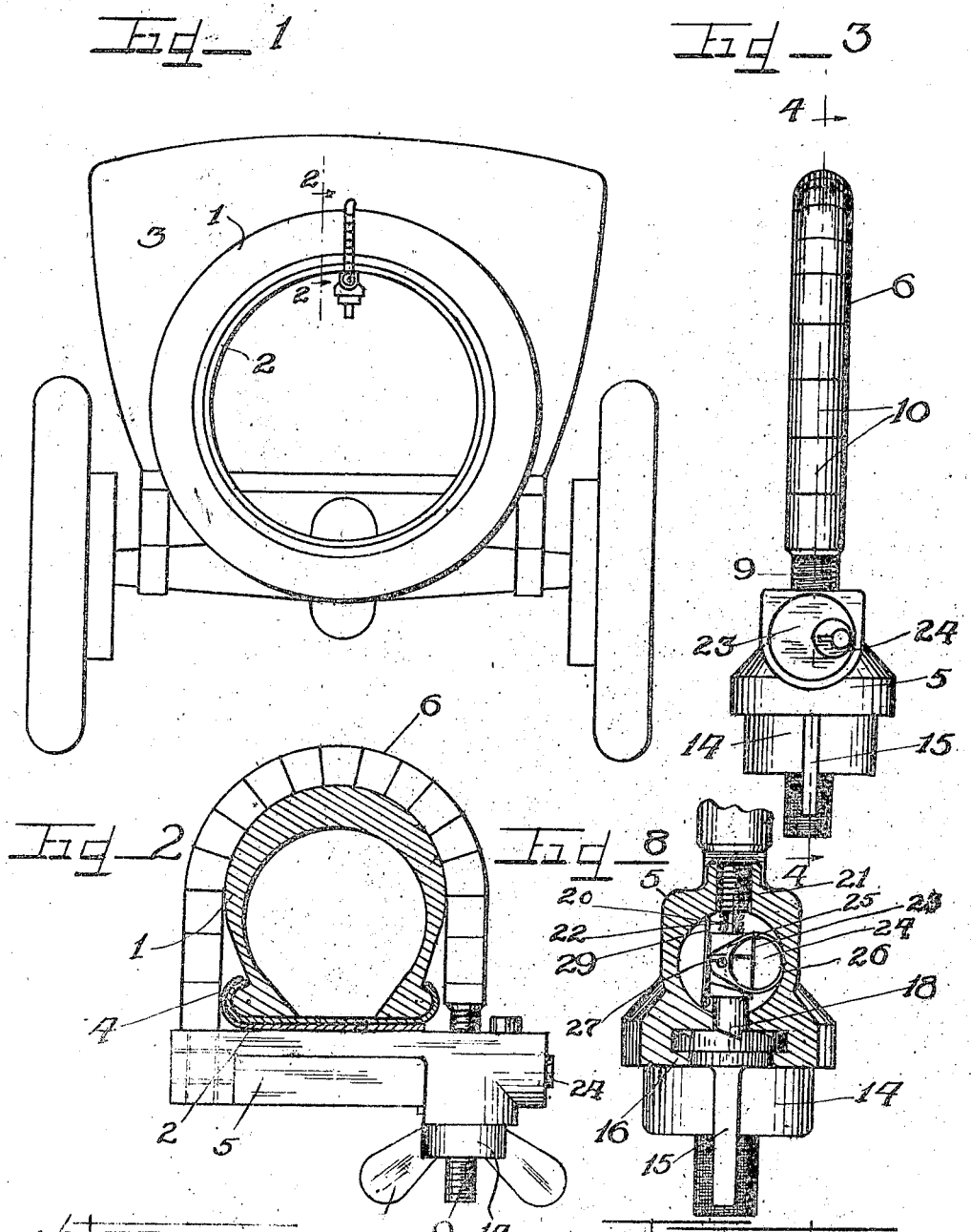

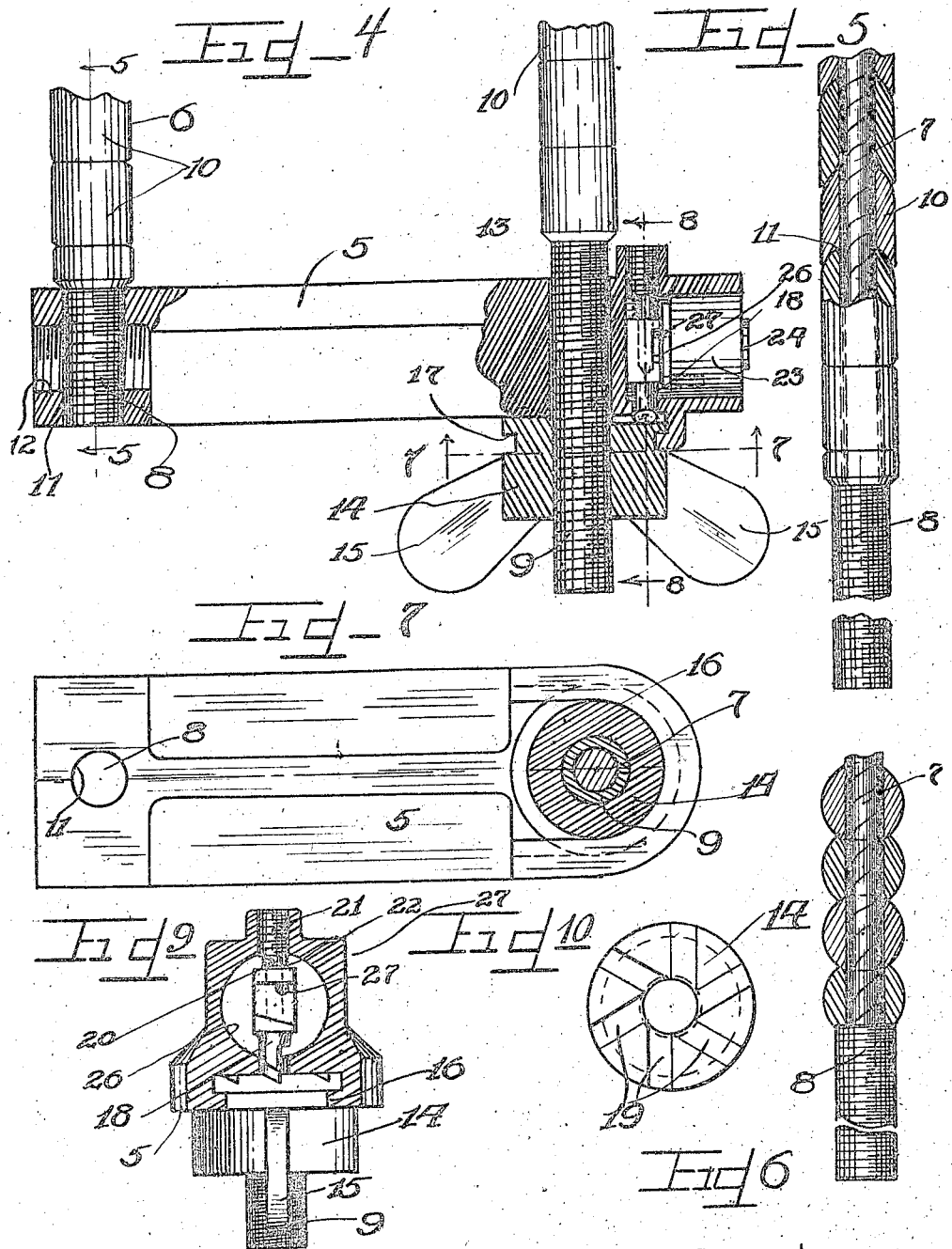

COLVIN L. JOHNSON, OF CHICAGO, ILLINOIS, ASSIGNOR TO JOHNSON AUTOMOBILE LOCK CO., OF CHICAGO, ILLINOIS, A CORPORATION OF ILLINOIS.

LOCKING DEVICE.

1,380,720.  Specification of Letters Patent.  Patented June 7, 1921.

Application filed September 8, 1919. Serial No. 322,440.

*To all whom it may concern:*

Be it known that I, COLVIN L. JOHNSON, a citizen of the United States, and a resident of the city of Chicago, in the county of Cook and State of Illinois, have invented certain new and useful Improvements in Locking Devices; and I do hereby declare that the following is a full, clear, and exact description of the same, reference being had to the accompanying drawings, and to the numerals of reference marked thereon, which form a part of this specification.

This invention relates to locking devices, and, although not restricted to such use, is particularly adapted for securing spare tires to an automobile and other purposes where a padlock and chain is used at the present time.

Automobile tire locks as heretofore constructed do not grip the tire firmly or if they will grip a tire of one size they will not go around a larger tire and a smaller sized tire is not held firmly thereby.

An additional disadvantage of the previous forms of tire locks is that they have been constructed of relatively soft material, so that they could be cut through by a file or other cutting tools.

A further disadvantage of the previous forms of tire locks is that they are apt to cut into the tire tread.

Also the prior forms of tire locks have not been adapted for use with either single or double tire supports.

It is an object, therefore, of the present invention to provide a tire lock which may be adjusted to grip firmly a tire of any desired size.

It is also an object of the invention to provide a tire lock which, although flexible, may be formed with a hardened steel surface so that it cannot be cut through by means of a file, hack-saw or similar tool.

It is also an object of the invention to provide a tire lock which will grip and lock a pair of tires as well as a single tire.

It is also an object of the invention to provide a tire lock having a relatively broad bearing surface upon the tire so that it will not injure its tread.

Other and further important objects of this invention will be apparent from the disclosures in the specification and drawings.

The invention (in a preferred form) is illustrated in the drawings and hereinafter more fully described:

On the drawings:

Figure 1 is a rear view of an automobile having a tire lock applied thereto embodying the features of the present invention.

Fig. 2 is a section on the line 2—2 of Fig. 1.

Fig. 3 is an end elevation of the tire lock.

Fig. 4 is a section on the line 4—4 of Fig. 3.

Fig. 5 is a section on the line 5—5 of Fig. 4.

Fig. 6 is a view similar to Fig. 5 of a modified form of armored cable.

Fig. 7 is a section on the line 7—7 of Fig. 4.

Fig. 8 is a section on the line 8—8 of Fig. 4.

Fig. 9 is a view similar to Fig. 8, with parts removed.

Fig. 10 is an enlarged top plan view of the nut with the wings omitted.

As shown on the drawings:

A tire 1 is shown mounted on a tire support or carrier 2 secured to the back of an automobile 3. The tire support or carrier may conveniently consist of a ring with a curved flange 4 around its inner edge for engagement with the bead of a tire, as shown more particularly in Fig. 2.

The tire lock comprises a bar 5 and an armored cable 6 detachably secured at its ends to the bar. The construction of the armored cable is shown more particularly in Figs. 4 and 5. This armored cable is formed of a stranded cable 7, preferably of steel wire, having attached to its ends externally threaded steel terminals 8 and 9. A very satisfactory method of uniting the cable to the terminals is by welding followed by case-hardening so that not only the terminals but also the end of the cable is made sufficiently hard to resist cutting or drilling. Intermediate the terminals 8 and 9, are arranged a series of rings 10, provided with spherical engaging surfaces 11, so that each ring may rock or rotate on the adjacent ring in order that the cable as a whole may be flexed within the desired limits. Preferably these rings are formed of steel case-hardened after machining to the desired size so that they cannot be cut through by a file or other similar tool.

As the purpose of these rings 10 is to prevent access to the inner cable by cutting tools and also to increase the bearing surface of the inner cable, the external form of these rings 10 may be changed within wide limits without detracting from their utility. Thus, if desired, the entire outer surface of the rings may be made spherical in form, as shown in Fig. 6. Further, armored cables of graduated lengths may be provided for each bar so as to adapt the lock for use with one, two or more tires or with tires or other parts of various sizes. Two apertures are provided in the end of the bar 5 for alternative engagement with the terminal 8. One of these apertures 11, is arranged transversely of the bar while the other aperture 12 is arranged longitudinally therein. Ordinarily the transverse aperture is employed when only one tire is to be locked, as shown in Fig. 2, while the longitudinal aperture is employed when the tire support is wide enough to carry two tires.

The terminal 9 of the armored cable is arranged to pass freely through a transverse aperture 13 in the opposite ends of the bar 5. A nut 14 is provided for engagement with the projecting end of the terminal 9, so that the cable may be drawn tightly around a tire so as to hold it firmly upon its support. Conveniently this nut may be formed with wings 15 so that it may be operated by hand without the aid of tools. The nut is ordinarily held in place on the lower side of the bar 5 by means of a U-shaped flange 16 formed on the underside of the bar 5 for engagement with a groove 17 on the upper part of the nut. With this arrangement the nut may be slid out of engagement with the flange 16 after the terminal 9 has been detached therefrom. So long as the terminal and the nut are in engagement, the latter can only rotate and cannot move away from the bar 5.

In order to prevent an unauthorized detachment of the nut from the end of the terminal 9, suitable locking devices are provided. In the present case this lock comprises a bolt 18, slidable parallel to the aperture 13, for engagement with one or other of a series of recesses 19, in the upper face of the nut. This bolt 18 is guided at its upper end by a pin 20, secured to a plug 21 threaded into an aperture in bar 5. This plug 21 is cut off after insertion so that it cannot be subsequently removed. Around the pin 20 is a light spiral spring 22, adapted normally to hold the bar 18 in engagement with one of the shoulders formed on the nut by the recesses 19. In order that the member 18 may be withdrawn when desired, suitable key operated devices may be employed. One of the most convenient devices for this purpose is a cylinder or pin lock 23, having a rotating cylinder 24. Secured to the inner end of this cylinder 24, is a cam 25, having a pin 27 adapted to extend into a recess 26 in the outer face of the bar 18. By inserting a key into the slot in the cylinder 24, the latter may be turned so as to bring the pin 27 into engagement with the upper shoulder of the recess 26, and thereby lift the bolt out of engagement with the nut 14 against the action of the spring 22. When this has been accomplished the nut may be freely rotated so as to disengage it from the terminal 9. As it would be awkward to have to retain pressure upon the key in the lock to hold the member out of engagement, means are preferably provided for releasably holding the lock and the member 18 in retracted position.

For this purpose a leaf spring 29 is provided adapted to engage the end of the cam 25 so that when the latter is moved upwardly to release the member 18 the leaf spring presses against the underside of this cam and tends to hold it in that position against the action of the spring 22.

The operation is as follows:

After the tire has been placed upon its support, the terminal 8 of the armored cable is threaded into the aperture 11 and the bar 5. The latter is then placed under the support for the tire and the armored cable is then brought around the tire so that the other terminal 9 may be passed through the aperture 13. The lock is then operated to retract the member 18, although this is not essential in view of the inclined surfaces of the recesses 19 and the end of the member 18, which allows the nut to be rotated so as to bring it into engagement with the terminal 9, while preventing rotation in the opposite direction to bring about the disengagement. The nut is rotated until the cable has been brought into firm contact with the tire. When it is desired to remove the tire, the key is inserted in the lock and the cylinder 24 is rotated to raise the member 18 out of engagement with the nut. The latter is then rotated to release the terminal 9, after which the terminal 9 is pulled out of the aperture 13 and the device removed from the tire and tire support.

I am aware that numerous details of construction may be varied through a wide range without departing from the principles of this invention, and I therefore do not purpose limiting the patent granted otherwise than necessitated by the prior art.

I claim as my invention:

1. A locking device comprising a bar, a flexible retaining member having one end secured to one end of the bar, said bar having an aperture at its other end for the passage of the other end of the retaining member therethrough, a nut for engagement with the projecting portion of the last mentioned end, and a lock adapted normally to prevent detachment of the nut from said end.

2. A locking device comprising a bar, a cable having threaded terminals, said bar having a threaded aperture at one end for engagement with one terminal and an aperture at the other end for the free passage of the other terminal therethrough, a nut for engagement with the projecting end of the last mentioned terminal, and a key controlled lock adapted normally to prevent detachment of the nut from said terminal.

3. A locking device comprising a bar, a cable having threaded terminals, said bar having two threaded apertures at one end for alternative engagement with one terminal, one of said apertures being transversely and the other longitudinally arranged within the bar, said bar also having an aperture at the other end for the free passage of the other terminal therethrough, a nut for engagement with the projecting end of the last mentioned terminal, and a lock adapted normally to prevent detachment of the nut from said terminal.

4. A locking device comprising a bar, a retaining member having one end secured to one end of the bar, said bar having an aperture at its other end for the passage of the other threaded end of the retaining member therethrough, a nut for engagement with the projecting portion of the threaded end, a locking member movable parallel to the threaded end adapted releasably to engage a shoulder on the nut to prevent its rotation, a spring for normally holding the locking member in engagement with the nut and key operated means for retracting said member against the action of said spring.

5. A locking device comprising a bar, a retaining member having one end secured to one end of the bar, said bar having an aperture at its other end for the passage of the other threaded end of the retaining member therethrough, a nut for engagement with the projecting portion of the threaded end, said nut having top grooves and a side groove, a flange integral with said bar adapted to engage in the side groove of said nut to hold the nut against axial movement, a locking member adapted to releasably engage in one of the top grooves of the nut to prevent its rotation, a spring for holding the locking member in engagement with the nut, and means for retracting said member against the action of said spring.

In testimony whereof I have hereunto subscribed my name in the presence of two subscribing witnesses.

COLVIN L. JOHNSON.

Witnesses:
EARL M. HARDINE,
LE ROY D. RILEY.